JOHN JOSEPH HENRY.
Improvement in Thread Cutters.

No. 115,469.                          Patented May 30, 1871.

Witnesses:
A. W. Almqvist
Wm. H. C. Smith

Inventor:
J. J. Henry

PER

Attorneys.

115,469

UNITED STATES PATENT OFFICE.

JOHN JOSEPH HENRY, OF BALTIMORE, MARYLAND, ASSIGNOR TO HIMSELF AND W. D. WILLIAMS, OF SAME PLACE.

IMPROVEMENT IN THREAD-CUTTERS.

Specification forming part of Letters Patent No. 115,469, dated May 30, 1871.

*To all whom it may concern:*

Be it known that I, JOHN JOSEPH HENRY, of Baltimore, in the county of Baltimore and State of Maryland, have invented a new and useful Improvement in Thread-Cutters; and I do hereby declare that the following is a full, clear, and exact description thereof, which will enable others skilled in the art to make and use the same, reference being had to the accompanying drawing forming part of this specification, in which—

Figure 1:
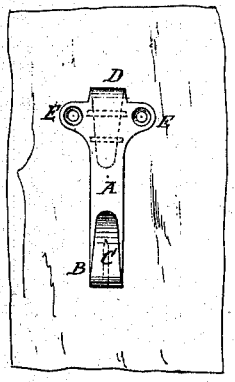
Figure 2:
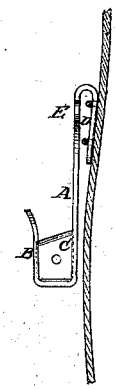

Figure 1 is a front view of my improved thread-cutter shown as attached to a piece of cloth. Fig. 2 is a side view of the same.

Similar letters of reference indicate corresponding parts.

My invention pertains to improvement in devices for cutting thread, cord, &c., such as are designed to be attached to clothing, so as to be convenient for their intended use. The invention consists in the arrangement of the cutter with the stock or body of the device, to adapt it for ready removal when requiring to be sharpened, or for other reasons.

A represents the body or plate of the device, upon the lower end of which is formed a hook, B. C is the knife, which is so formed as to fit into a shallow groove or recess formed to receive it in the concavity of the hook B, where it is kept in place by the elasticity of the metal forming the said hook B. The upper or cutting edge of the knife C is made inclined, as shown, to cause it to cut the the thread or cord more freely. Upon the rear side of the upper end of the plate A may be formed a hook, D, to hook into loops formed upon the lady's dress or other place where the device may be attached.

Having thus described my invention, I claim as new and desire to secure by Letters Patent—

The removable cutter C fitting in grooves in the plate A and hook B, substantially as shown and described.

JOHN JOSEPH HENRY.

Witnesses:
  JAMES G. B. CLACKNER,
  JOHN SLUEIN.